No. 821,128. PATENTED MAY 22, 1906.
G. A. SCHULTZ.
PLOW ATTACHMENT.
APPLICATION FILED DEC. 21, 1905.
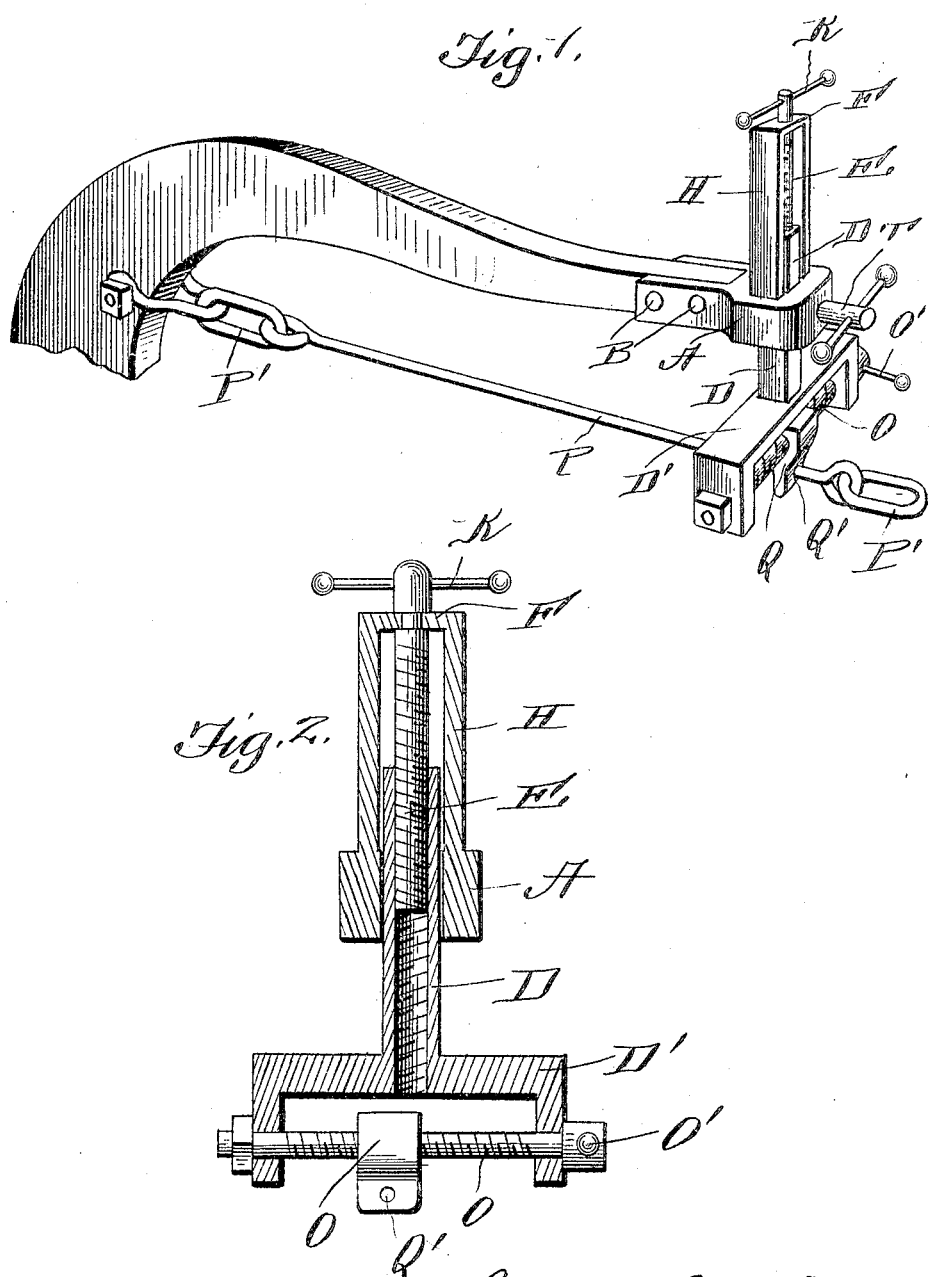
Witnesses
R. A. Biswell,
E. M. Hough.
Inventor
Geo. A. Schultz,
By Frank N. Hough
Attorney

UNITED STATES PATENT OFFICE.

GEORGE A. SCHULTZ, OF RINGLE, WISCONSIN.

PLOW ATTACHMENT.

No. 821,128.     Specification of Letters Patent.     Patented May 22, 1906.

Application filed December 21, 1905. Serial No. 292,769.

*To all whom it may concern:*

Be it known that I, GEORGE A. SCHULTZ, a citizen of the United States, residing at Ringle, in the county of Marathon and State of Wisconsin, have invented certain new and useful Improvements in Plow Attachments; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in plow attachments, the object of the invention being to provide means whereby the cutting of the plow as to depth or width of furrow may be easily and quickly adjusted.

My invention comprises various details of construction and combinations and arrangements of parts, which will be hereinafter fully described and then specifically defined in the appended claim.

I illustrate my invention in the accompanying drawings, in which—

Figure 1 is a perspective view showing the application of my invention to a plow-beam; and Fig. 2 is a sectional vertical view through the supporting-post, which is fastened to the beam of a plow.

Reference now being had to the details of the drawings by letter, A designates a post having a forked shank portion designed to engage a plow-beam, and bolts B are passed through registering apertures through said shank portion, whereby the post may be securely held to the plow-beam. The upper end of said post has an angular outlined opening therein for the reception of the shank portion D of the yoke D'. Said yoke D' is hollow, and the inner surface thereof is provided with threads for engagement with the threads of the screw E, which is swiveled in an aperture in the cross-piece F of the rack H, which projects from said post adjacent to the opening therein. The end of said screw is provided with a bar K, which passes through an aperture in the screw, affording means whereby the latter may be conveniently turned in one direction or another. Said yoke D' has a threaded shaft O mounted in the arms thereof, and a bar O', passing through an aperture in the end of said screw O, affords means for turning the screw.

Q is a block having a transverse threaded aperture fitted upon the screw O, and passing through an opening Q' in said block is a rod P, the ends of which are turned into eyes which engage the rings P' and to which a clevis or other suitable means may be attached, whereby a whiffletree or evener may be connected.

In order to hold the yoke in an adjusted position, I provide a set-screw T, which is mounted in a threaded aperture in the upper end of the post and is adapted to be screwed down against the face of the shank portion of the yoke, whereby the latter may be gripped with sufficient force to hold the same in different positions.

In operation when it is desired to regulate the plow to cut deep or shallow, the screw engaging the threads in the hollow shank portion D is rotated in one direction or the other, thus causing the rack to be moved toward or away from the post carrying the same, and to regulate the plow to cut a wide or narrow furrow the screw O is turned in one direction or the other by means of the bar connected to the end thereof, thereby causing the block Q to be moved laterally in one direction or the other.

From the foregoing it will be observed that by the provision of the apparatus shown and described a simple and efficient mechanism is provided, which may be readily attached to any ordinary plow-beam for the purpose of regulating the depth or the width of the furrow to be turned.

Having thus fully described my invention, what I claim as new, and desire to secure by Letters Patent, is—

In combination with a post having a shank portion which is forked, means for fastening the same to a plow-beam, a rack projecting from said post upon opposite sides of a transverse opening through the same, a yoke having a hollow shank portion, the inner wall of which is threaded, a feed-screw having a portion thereof journaled in said rack and engaging the threads of the shank portion, means for holding the yoke in an adjusted position, a screw mounted in the arms of said yoke, a threaded block mounted upon said screw carried by the yoke, and a rod passing through an aperture in said block, as set forth.

In testimony whereof I hereunto affix my signature in the presence of two witnesses.

GEO. A. SCHULTZ.

Witnesses:
CHRIST VOLKMAN,
JOHN TREU.